C. S. THOMPSON.
VENTILATING AND AIR COOLING SYSTEM.
APPLICATION FILED SEPT. 4, 1913.
1,117,612.
Patented Nov. 17, 1914.
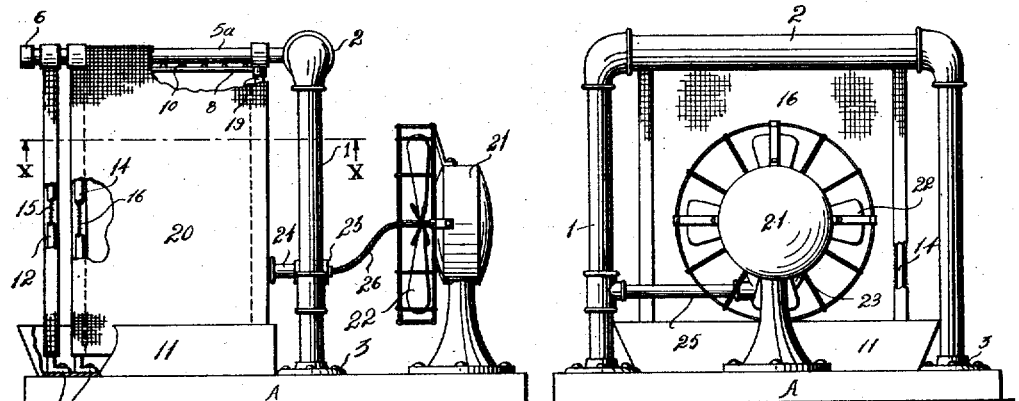
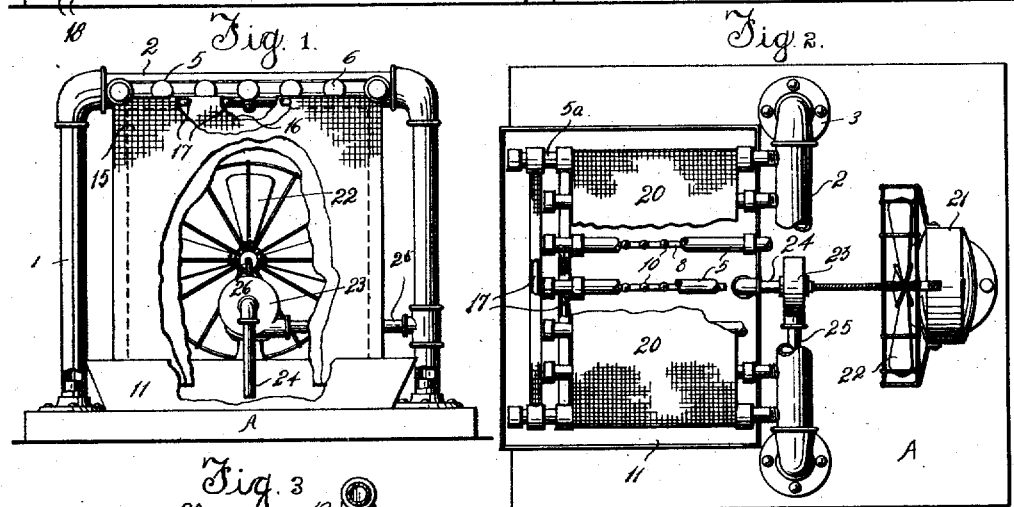
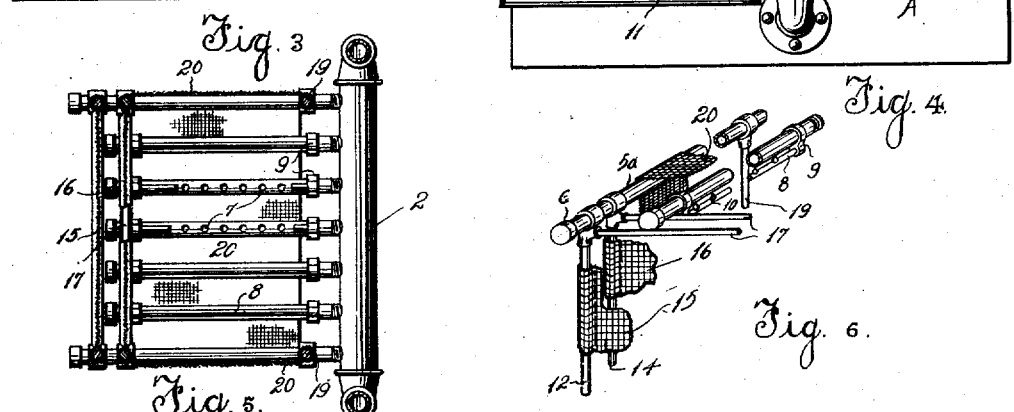
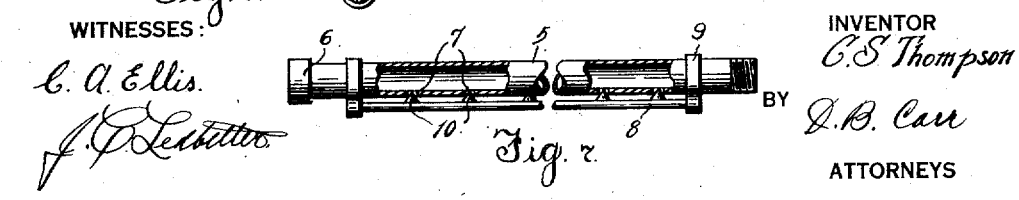

UNITED STATES PATENT OFFICE.

CARL S. THOMPSON, OF DALLAS, TEXAS.

VENTILATING AND AIR-COOLING SYSTEM.

1,117,612.  Specification of Letters Patent.  Patented Nov. 17, 1914.

Application filed September 4, 1913. Serial No. 788,041.

*To all whom it may concern:*

Be it known that I, CARL S. THOMPSON, a citizen of the United States, residing at 2119 Cedar Springs avenue, Dallas, in the county of Dallas and State of Texas, have invented certain new and useful Improvements in Ventilating and Air-Cooling Systems, of which the following is a specification.

My invention relates to new and useful improvements in ventilating and air cooling systems.

Primarily the object of the invention is to provide for washing and cooling a volume of air and passing it through the areas to be cooled under a smooth and even pressure.

Another object of the invention is to provide a system whereby an air draft is passed through a mist or spray of water, means being provided for obtaining a continuous spray and confining same to the cooling plant.

With the above and other objects in view the invention has relation to certain novel features of construction and operation, an example of which is described in this specification and illustrated in the accompanying drawing, wherein:

Figure 1 is a side elevation of the device with certain parts broken away and shown in section. Fig. 2 is a rear elevation. Fig. 3 is a front elevation. Fig. 4 is a plan view. Fig. 5 is a view upon the line *x—x* of Fig. 1. Fig. 6 is a fragmentary perspective view of one of the front corners of the device. Fig. 7 is a view of one of the water spraying tubes.

Similar reference characters refer to similar parts throughout the several views.

In the drawings is shown an inverted U shaped pipe member composed of the vertical pipes 1 and the horizontal pipe 2 of somewhat greater diameter and establishing a communication between the pipes 1. Flanges 3 support the pipes 1 to a suitable base member or table A. The pipes 1 serve as a support for the structure as will later be seen.

The bottom of the pipes 1 are shown in Fig. 3 to be closed with a plug 4. The member 2 carries a plurality of horizontal tubes 5 which have their outer ends capped as indicated at 6. The tubes 5, along their under edge, have a row of small apertures 7 equidistantly spaced. A small cylindrical rod 8 is supported just beneath the tubes 5 by the brackets 9. The rod 8 carries a number of integral cone-shaped bosses 10 which are equidistantly spaced and adapted to enter and partly close the holes or apertures 7. The bases of the cone-shaped bosses will preferably have a diameter greater than that of the rod 8. The outermost tubes 5ª are shown to be somewhat longer than the adjacent ones. These tubes are adapted to receive several rod supports, as will later be seen. A pan or receptacle 11, having an exposed area somewhat greater than that included in the tubes 5, is disposed beneath the tubes 5 and supported by the base A. The outer ends of the tubes 5ª may be supported by a plurality of vertical rods. In this instance 12 and 14 indicate pairs of vertical rod supports, which said pairs are adapted to support fabric water screens 15 and 16 respectively. The upper ends of the pairs of rods 12 and 14 are connected by light horizontal brace rods 17 which further support and hold the fabric screens in taut condition. This gives an arrangement of vertically parallel screens disposed beneath and at the outer ends of the tubes 5. The lower ends of the rods 12 and 14 are fastened in the pan as shown at 18. The fabric ends extend preferably below the rim of the pan. Adjacent to the pipes 1 and carried by the tubes 5ª is a pair of vertical rods 19. Their top and bottom connections to the tubes and pan are similar to the ones just described. The pairs of rods 14 and 19 carry a housing 20, in this instance heavy fabric, which housing extends below the rim of the pan and over the top of the structure lying in contact with the tubes 5. The side walls and top of the housing are therefore one continuous member inclosing the structure and having its lower edges extending into the pan.

A source of continuous air supply is to be projected from the rear through the housing of the structure beneath the tubes 5 and through the screens. In this instance is shown an electric fan 21 having blades 22 of suitable size placed at the rear of the device and adapted to furnish the required air volume.

In larger systems such as would be adaptable for cooling theaters and other buildings, a centrifugal air blower or other means would be preferably used for projecting the air.

Provision is had for circulating water through the structure just described. A pump 23 is supported upon the base A and in proximity to the fan shaft. The pump has an inlet pipe 24 communicating with the pan 7 and an outlet pipe 25 communicating with one of the pipes 1. The pump in this instance is shown driven from the fan shaft by a flexible shaft 26. The pump is adapted to furnish a constant water pressure to the tubes 5 through the pipes 1 and 2.

The arrangement as described and shown in Fig. 7 is adapted to spray the water in a constant downpour of mist, the pan receiving and delivering the water to the pump. The coarse fabric screens are placed directly in front of the air draft, but allow the air to pass through them owing to the coarseness of the mesh. The function of the screens is to prevent the water spray from being blown from the apparatus. The screens will absorb and retard the dampness, but will allow the cooled air to pass through. The air volume will be cooled and washed as it passes through the precipitation of cool mist or spray.

The invention is presented as including all such modifications and changes as properly come within the scope of the following claim.

What I claim, is:

In a device of the character described, the combination of a pair of vertical pipe members with a horizontal reservoir, a pair of horizontal rod members, vertical rod supports for the horizontal members, a casing carried by the rod members and covering the structure, rods arranged to support a plurality of water screens, horizontal tubes carried by the reservoir, a plurality of apertures in the tubes, a rod beneath the tubes, conically shaped spray members carried by the rod and partly closing the apertures.

In testimony whereof I have signed my name to this specification in the presence of two subscribing witnesses.

CARL S. THOMPSON.

Witnesses:
E. R. WM. BRUCKNER,
J. C. LEDBETTER.

Copies of this patent may be obtained for five cents each, by addressing the "Commissioner of Patents. Washington, D. C."